May 15, 1962 W. C. MARCHAND 3,034,369
LOAD EQUALIZER

Filed May 16, 1960 3 Sheets-Sheet 1

INVENTOR.
WILLIAM C. MARCHAND
BY
ATTORNEYS

May 15, 1962  W. C. MARCHAND  3,034,369
LOAD EQUALIZER
Filed May 16, 1960  3 Sheets-Sheet 2
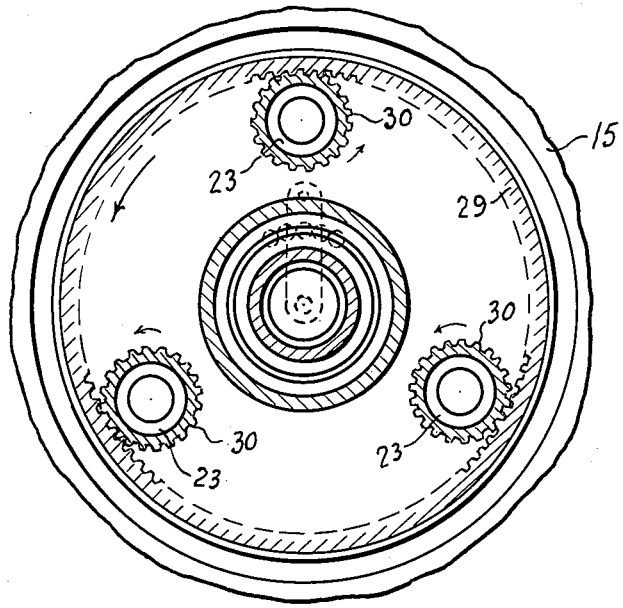
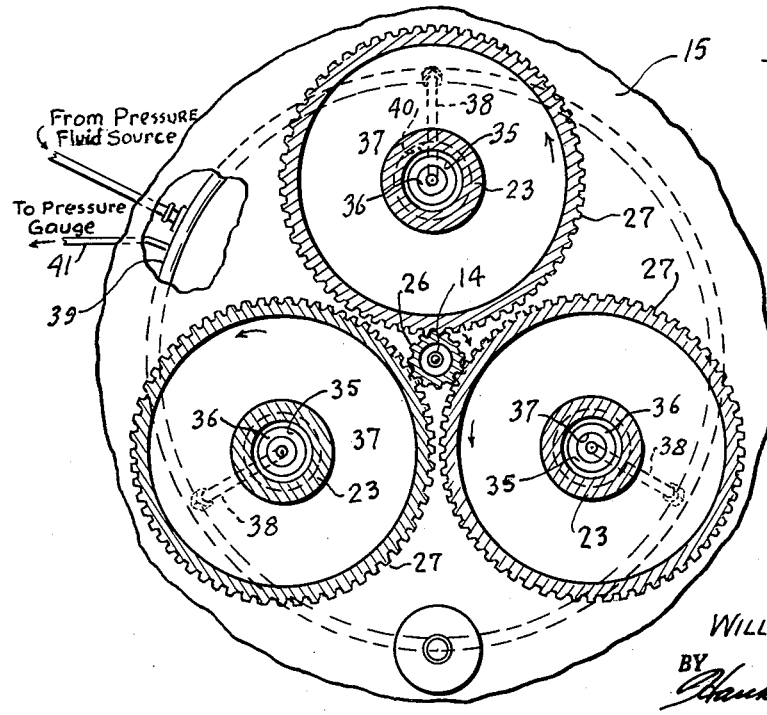
INVENTOR.
WILLIAM C. MARCHAND
BY
ATTORNEYS

United States Patent Office 3,034,369
Patented May 15, 1962

---

3,034,369
LOAD EQUALIZER
William C. Marchand, Detroit, Mich., assignor to Continental Aviation and Engineering Corporation, Detroit, Mich., a corporation of Virginia
Filed May 16, 1960, Ser. No. 29,223
2 Claims. (Cl. 74—410)

My invention relates to power transmission devices and more particularly to a simplified means for equalizing gear tooth loading on the gearing of a power transmission and providing a simplified and effective means for measuring positive and negative torque.

Equalization of tooth loading on gear trains, particularly in high speed transmissions as used in turbine and turbo-prop engines, was heretofore accomplished through close tolerance accurate manufacture of the gears. The present device reduces the need for such close-tolerance manufacture and as a valuable side effect, provides ready-made a means for measuring both positive and negative torque.

An object of the present invention is to improve the operation and increase useful life of power transmissions and the like by providing an effective means of equalizing loading on gears.

Another object of the invention is to simplify the manufacture of power transmissions by providing a load equalizing device that reduces the requirement of extremely accurate gear machining.

A further object of the invention is to improve engine instrumentation by providing a simplified transmission torque meter.

For a more complete understanding of the invention reference may be had to the accompanying drawing illustrating a preferred embodiment of the invention in which like reference characters refer to like parts throughout the several views and in which—

FIG. 2 is a cross-sectional view taken substantially on the line 2—2 of FIG. 1.

FIG. 3 is a cross-sectional view taken substantially on the line 3—3 of FIG. 1.

Figure 1:
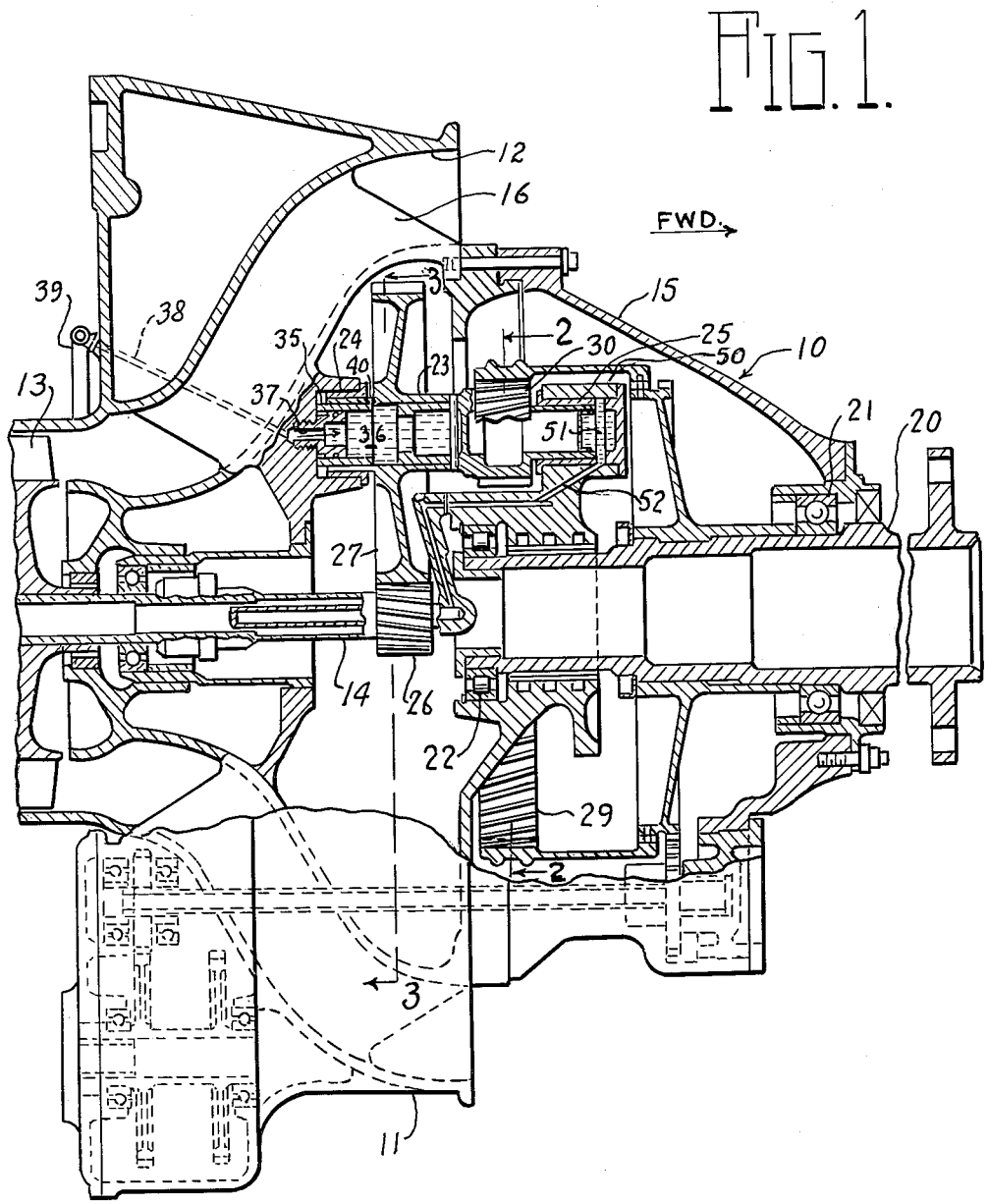
FIG. 1 is a fragmentary cross-sectional view of the power transmission portion of a preferred turboprop engine embodying the invention.
Figure 4:
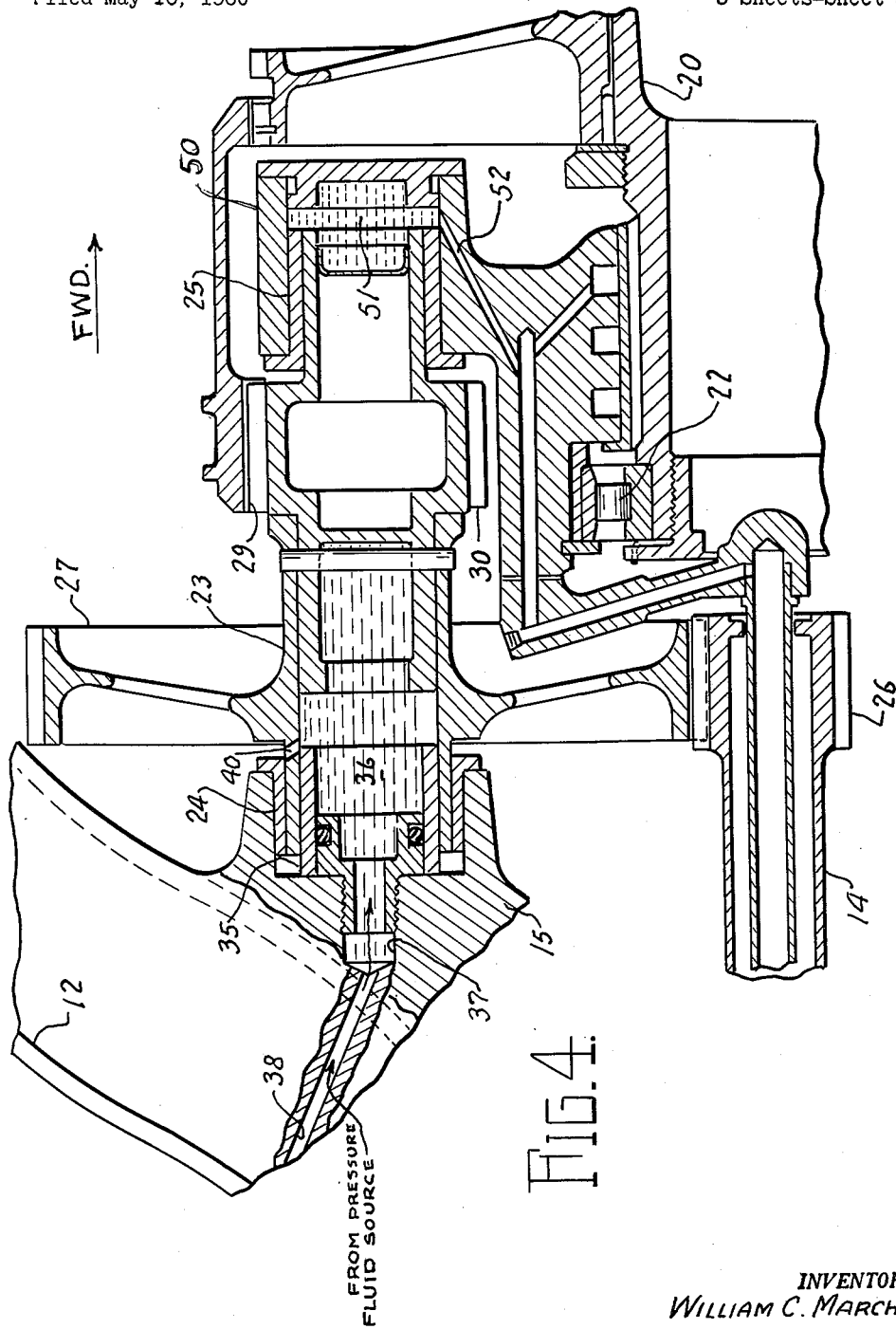
FIG. 4 is a fragmentary enlarged cross-sectional view of a portion of FIG. 1.

The forward portion of a preferred turboprop engine 10 is illustrated as comprising a housing structure 11 having an annular air intake opening 12 directing intake air to a compressor 13, from whence it flows to the combustion chamber (not shown), to be mixed with fuel and the mixture ignited to drive a turbine (not shown) which is preferably connected to a driving shaft 14 extending forward through the center of the engine into a power transmission assembly enclosed in a casing 15 and supported within the annular intake opening 12 by any means such as struts 16.

A driven propeller shaft 20 is rotatably supported in the casing 15 by bearings 21 and 22. A plurality, preferably three, of angularly spaced jackshafts 23 are rotatably carried by the casing 15 in bushings 24 and 25 and are arranged to be axially movable with respect to the driving and driven shafts 14 and 20.

The driving shaft 14 has a drive gear 26 on its forward end, meshing with larger gears 27, one being carried by each of the jackshafts 23.

The driven shaft 20 has secured thereto ring gear 29 carried thereon, meshing with small gears 30, one being carried on each of the jackshafts 23.

The above gearing is designed to impose an axially directed force on the jackshafts 23 directly proportional to the torque delivered by the engine through the driving shaft 14. Helical gearing is preferred for this purpose. The gears 26 and 27, or the gears 29 and 30, or both sets of gears may have inclined teeth; the latter case being illustrated in the present drawing.

As shown, the helical gears 26 and 27 have teeth inclined such that during engine operation, forces are imposed tending to move the jackshafts 23 axially forward, while the helical gears 29 and 30 have teeth inclined in the opposite direction such that counterforces are imposed tending to oppose forward movement of the jackshaft.

The net effect, whether both sets or only one set of helical gears is used, is to impose endwise or axial thrust on the floating jackshafts 23, this thrust being directly proportional to torque. In the present case, although there may be no inherent advantage in providing thrust in both directions, it is desirable in case the thrust in one direction is too great.

It may be found that the driven ring gear 30 is slightly off-center with respect to the driving sun gear 26, the jackshafts 23 may be unequally spaced; the angular relation of the gear teeth of the two gears of the jackshaft may be different from this relationship on the other jackshaft, or other slight variations of construction may occur, such that one jackshaft will tend to carry a greater proportion of the load. In fact, it is known that never can absolute equality be achieved, and that jackshaft which carries the greatest load will have a tendency to unload itself by moving axially to its limit. In conventional transmissions, where endwise thrust is restrained, the unequal loading would cause unequal wearing of the gear teeth. In the present transmission, each jackshaft is prevented from moving to its limit as follows:

The jackshafts 23 are made hollow and the rear end of each is adapted to slide axially on a cylinder 35, providing a variable volume chamber 36. The rear end of each chamber is connected with a port 37 to which fluid under pressure from a pump (not shown) is directed through conduits 38.

In effect, the jackshafts 23 operate as pistons movable relative to the cylinders 35. Thus, fluid pressure is added to the torque forces tending to thrust the jackshafts forward, as opposed by the counter torque forces.

A leakage orifice 40 is provided, preferably in the shaft 23, open to one of the chambers 36, and arranged to be opened and closed on axial movement of the jackshaft 23. The gearing is arranged so that an increase in torque tends to move the jackshaft 23 rearward, closing the orifice 40 in direct relation to torque. As the orifice 40 closes, oil pressure in the chamber 36 will rise in direct proportion to the torque. Any means such as a pipe 39 or the like is connected to each of the conduits 38 so that this fluid pressure will equalize throughout the system, thereby equalizing the loading on all the jackshafts 23 to provide equality of gear tooth loading at all times.

Inasmuch as the fluid pressure, rising and falling as the orifice 40 closes and opens, is directly proportional to the torque, a measurement of this fluid pressure by any preferred gauge or device (not shown), properly calibrated to translate pressure into torque values, may be made by connecting through any preferred means to the fluid system as by a conduit 41 connected to the pipe 39.

In some uses of a power transmission, as for example in turbo-prop engines, it may be advisable or necessary to provide some means for measuring reverse or negative torque. For example, in the case of a gas turbine turboprop engine in operation, a flameout can have disastrous consequences, as the reverse thrust suddenly imposed acts as a violent brake with disastrous results. Conventional overrunning clutch arrangements and the like are not practical since on landing the aircraft, it is necessary to have some braking action to prevent undesirable gliding.

In the present invention a means is provided for making a measurement of or sensing this negative torque, as follows:

The forward ends of the jackshafts 23 are axially slidable in cylinders 50 to provide for each a fluid chamber 51 connected by any means such as a drilled passage 52 to the oil delivery system of the engine, supplied with oil under a constant pressure from the engine oil pump (not shown). If engine oil is at a normal pressure, for example 35 pounds, this pressure will be added to the thrust opposing the pressure of fluid in the chamber 36. The "zero" point of the aforesaid gauge connected into the fluid system previously described will thus not be true zero but will be 35 pounds, the pressure in the chamber 51 in effect "deceiving" the fluid pressure sensed by the aforesaid gauge to this extent. Now, on an increase of negative torque which would otherwise act to reduce fluid pressure in the chamber 36 to zero but not beyond, since there is no such thing as "negative pressure," there is provided the additional 35 pounds below the "zero" mark on the gauge. Any such "negative" torque is thus sensed and the gauge or pressure lines may be connected with any desired system (not shown) to either indicate the condition to the pilot or to automatically feather the propellers. In effect, the same fluid pressure system senses both positive and negative torques.

Although only one preferred embodiment of the invention has been described, it will be apparent to one skilled in the art to which the invention pertains that various changes and modifications may be made therein without departing from the spirit of the invention or the scope of the appended claims.

I claim:

1. In a power transmission, a driving means, a driven means, and a plurality of individual intermediate means drivingly connecting said driving means with said driven means, said intermediate means each being individually supported and longtudinally movable on an axis, means imposing forces on said intermediate means proportional to torque and tending during operation to move each of said coupling means in the same axial direction, auxiliary pressure means variably opposing the aforesaid forces in direct proportion thereto, means equalizing the auxiliary pressures opposing movement of said intermediate means, and a second auxiliary pressure means adding force to the aforesaid forces whereby movement of said coupling means in either of two possible axial directions may be measured.

2. In a power transmission, a rotatable driving shaft, a rotatable driven shaft, and a plurality of individually supported rotatable intermediate jackshafts axially movable with respect to said driving and driven shaft, said driving shaft having a gear, each of said jackshafts having a gear meshed with said driving shaft gear, said driven shaft having a gear, said jackshafts each having a second gear meshed with said driven shaft gear, at least one set of meshed gears being helical to impose axial thrust on said jackshafts proportional to torque, a fluid pressure cylinder axially aligned with each jackshaft, each jackshaft having an integral piston on one end axially movable in and relative to the respective cylinder, said cylinders each having one closed end to provide pressure chambers between each closed end and the respective pistons, conduit means openly connecting said chambers one with the other, a fluid pressure means, and means connecting same with said chambers, the fluid pressure being operable to oppose said thrust forces on each jackshaft, means regulating fluid pressure to make same proportional to said thrust forces whereby said fluid pressure provides a proportional indication of positive torque, another fluid pressure cylinder axially aligned with at least one of said jackshafts, said jackshaft having a second integral piston on its other end and axially movable in the last mentioned cylinder, same having a closed end to provide a second pressure chamber between the closed end and the piston, means connecting said second chamber with predetermined substantially constant pressure adding to said thrust forces opposed by said first fluid pressure whereby said first fluid pressure provides a proportional indication of negative torque.

References Cited in the file of this patent

UNITED STATES PATENTS

| | | |
|---|---|---|
| 1,458,131 | Davis | June 12, 1923 |
| 2,225,863 | Halford et al. | Dec. 24, 1940 |
| 2,899,822 | Matthews | Aug. 18, 1959 |